United States Patent
Lo et al.

(10) Patent No.: US 7,956,680 B2
(45) Date of Patent: Jun. 7, 2011

(54) LOW-NOISE DC OFFSET CALIBRATION CIRCUIT AND RELATED RECEIVER STAGE

(75) Inventors: Chi-Lun Lo, Taoyuan County (TW); Yu-Hsin Lin, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 12/767,812

(22) Filed: Apr. 27, 2010

(65) Prior Publication Data

US 2010/0201423 A1    Aug. 12, 2010

Related U.S. Application Data

(63) Continuation-in-part of application No. 12/168,159, filed on Jul. 7, 2008, now Pat. No. 7,737,775.

(51) Int. Cl.
*H03F 1/02* (2006.01)
(52) U.S. Cl. .......................... 330/9; 330/282
(58) Field of Classification Search ............ 330/9, 86, 330/282, 284; 327/124, 307
See application file for complete search history.

(56) References Cited

U.S. PATENT DOCUMENTS

| | | | |
|---|---|---|---|
| 5,742,183 A * | 4/1998 | Kuroda | 326/81 |
| 6,407,630 B1 * | 6/2002 | Yao et al. | 330/9 |
| 6,545,534 B1 | 4/2003 | Mehr | |
| 7,012,458 B1 | 3/2006 | Roo | |
| 7,057,454 B2 * | 6/2006 | Ma et al. | 330/86 |
| 7,352,238 B2 | 4/2008 | Elwan | |

* cited by examiner

*Primary Examiner* — Khanh V Nguyen
(74) *Attorney, Agent, or Firm* — Winston Hsu; Scott Margo

(57) ABSTRACT

A DC offset calibration circuit has a first resistor, a first switch, a second resistor, and a second switch. The first resistor is coupled to a first supply voltage. The first switch is coupled to the first resistor, to a first input of an amplifier, and to a first input resistor. A second end of the first input resistor is not coupled to the first supply voltage. The second resistor is coupled to a second supply voltage. The second switch is coupled to the second resistor, to a second input of the amplifier, and to a first end of a second input resistor. A second end of the second input resistor is not coupled to the second supply voltage.

8 Claims, 9 Drawing Sheets

LOW-NOISE DC OFFSET CALIBRATION CIRCUIT AND RELATED RECEIVER STAGE

CROSS REFERENCE TO RELATED APPLICATIONS

This application is a continuation-in-part of U.S. patent application Ser. No. 12/168,159 filed Jul. 7, 2008, and entitled "Low-noise DC Offset Calibration Circuit and Related Receiver Stage", which is incorporated herein by reference.

BACKGROUND OF THE INVENTION

1. Field of the Invention

The present invention relates to DC offset calibration circuits, and more particularly, to a low-noise DC offset calibration circuit and related receiver stage.

2. Description of the Prior Art

In wireless receiver design, because overall gain of the wireless receiver is very high, even slight process variations can cause a large DC offset at an output of the wireless receiver. Dynamic range of the output, which is passed to a baseband circuit, is thereby reduced.

A wireless receiver 10, shown in FIG. 1, includes a low noise amplifier (LNA) 100, a mixer 110, a channel-select filter 120, and a programmable gain amplifier (PGA) 130. To reduce DC offset of the wireless receiver 10, a DC offset calibration circuit 140 may be used to perform DC offset compensation. The DC offset calibration circuit 140 includes a number of switched current sources 141, which may be coupled to an input end of an operational amplifier 131 of the PGA 130, as shown in FIG. 2. A DC offset compensation voltage is then generated across feedback resistors Rfb. DC offset calibration resolution is determined by sizes of the switched current sources 141. In order to provide better resolution, transistors utilized for realizing the switched current sources are relatively small, which leads to a large contribution of flicker noise.

SUMMARY OF THE INVENTION

According to one embodiment, a DC offset calibration circuit comprises a first resistor, a first switch, a second resistor, and a second switch. A first end of the first resistor is coupled to a first supply voltage. A first end of the first switch is coupled to a second end of the first resistor. A second end of the first switch is coupled to a first input of an amplifier and a first end of a first input resistor. A second end of the first input resistor is not coupled to the first supply voltage. A first end of the second resistor is coupled to a second supply voltage. A first end of the second switch is coupled to a second end of the second resistor, and a second end of the second switch is coupled to a second input of the amplifier and a first end of a second input resistor. A second end of the second input resistor is not coupled to the second supply voltage.

According to another embodiment, a receiver stage comprises an operational amplifier, a first feedback resistor coupled between a first output of the operational amplifier and a first input of the operational amplifier, a second feedback resistor coupled between a second output of the operational amplifier and a second input of the operational amplifier, and a DC offset calibration circuit. The DC offset calibration circuit comprises a first resistor, a first switch, a second resistor, and a second switch. A first end of the first resistor is coupled to a first supply voltage. A first end of the first switch is coupled to a second end of the first resistor. A second end of the first switch is coupled to a first input of the operational amplifier and a first end of a first input resistor. A second end of the first input resistor is not coupled to the first supply voltage. A first end of the second resistor is coupled to a second supply voltage. A first end of the second switch is coupled to a second end of the second resistor, and a second end of the second switch is coupled to a second input of the operational amplifier and a first end of a second input resistor. A second end of the second input resistor is not coupled to the second supply voltage.

According to another embodiment, a DC offset calibration circuit comprises a resistor, and a switch. A first end of the resistor is coupled to a supply voltage. A first end of the switch is coupled to a second end of the resistor and a second end of the switch is coupled to a first input of an amplifier. The second end of the switch is further coupled to a first end of an input resistor, and a second end of the input resistor is not coupled to the supply voltage.

According to another embodiment, a receiver stage comprises an operational amplifier, a first feedback resistor coupled between a first output of the operational amplifier and a first input of the operational amplifier, a second feedback resistor coupled between a second output of the operational amplifier and a second input of the operational amplifier, a resistor, a switch, and an input resistor. A first end of the resistor is coupled to a supply voltage. A first end of the switch is coupled to a second end of the resistor and a second end of the switch is coupled to the first input of the operational amplifier. The input resistor has a first end coupled to the second end of the switch, and has a second end not coupled to the supply voltage.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . .". Also, the term "couple" is intended to mean either an indirect or direct electrical connection. Accordingly, if one device is coupled to another device, that connection may be through a direct electrical connection, or through an indirect electrical connection via other devices and connections.

Figure 1:
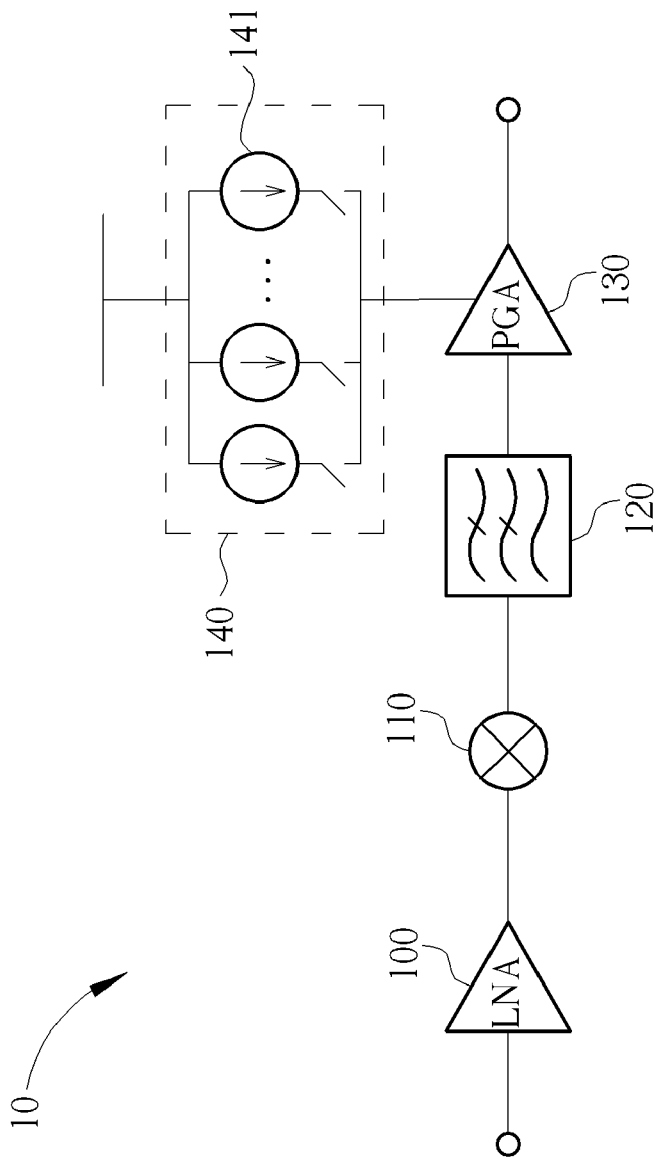
FIG. 1 is a diagram of a wireless receiver with a DC offset calibration circuit according to the prior art.
Figure 2:
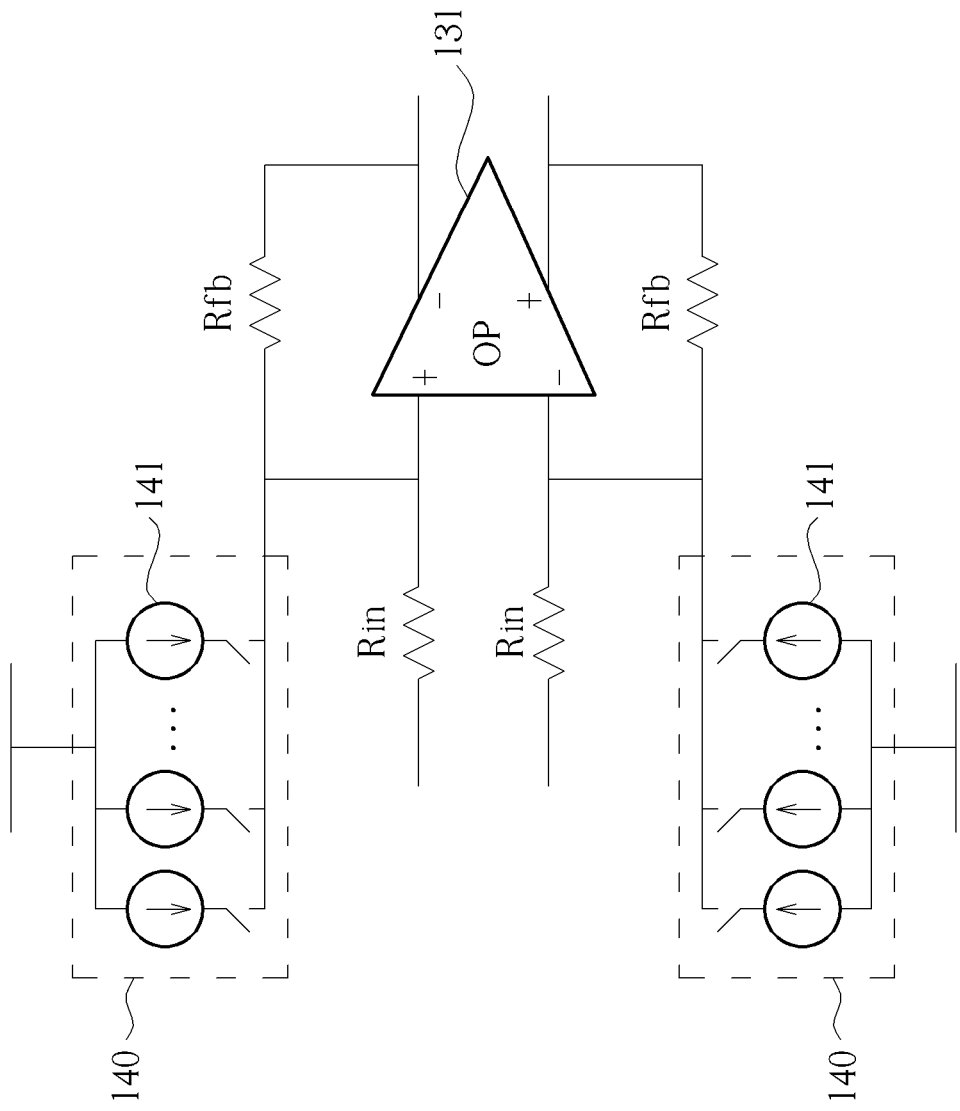
FIG. 2 is a diagram of an operational amplifier of a programmable gain amplifier of the wireless receiver of FIG. 1 with the DC offset calibration circuit according to the prior art.
Figure 3:
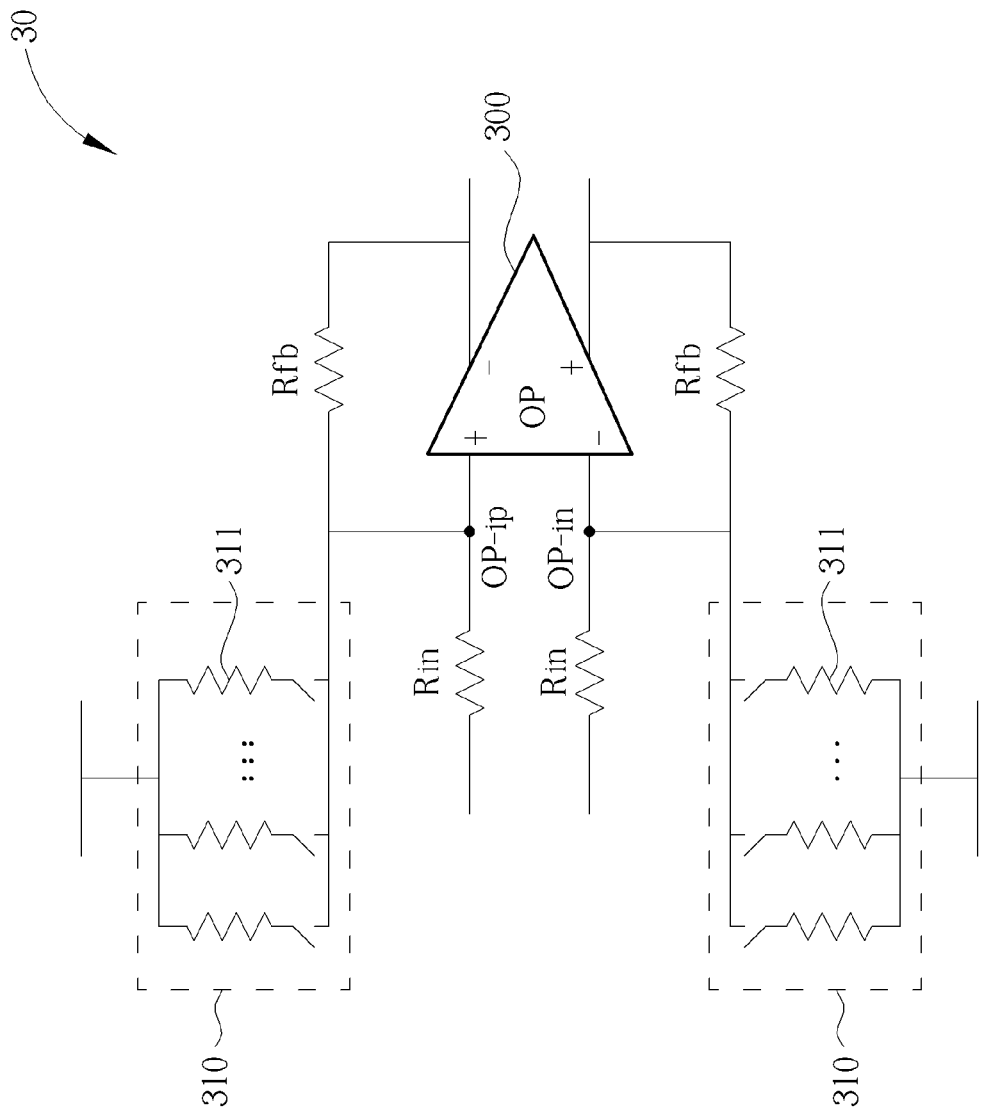
FIG. 3 is a diagram of an operational amplifier calibrated by a low noise DC offset calibration circuit according to an embodiment of the present invention.

Please refer to FIG. 3, which is a diagram of an operational amplifier 300 of a receiver stage 30, such as the programmable gain amplifier described above, calibrated by a low noise DC offset calibration circuit 310 according to a first embodiment of the present invention. The low noise DC offset calibration circuit 310 comprises a plurality of switched resistor units 311 coupled to input ends op_ip, op_in of the operational amplifier 300 and to respective supply voltages. Each switched resistor unit 311 comprises a resistor in series with a switch. First ends of each of the resistors of the low noise DC offset calibration circuit 310 are coupled to either a first supply voltage or a second supply voltage. In this embodiment, the first supply voltage may be substantially equal to the second supply voltage. First ends of each of the switches are coupled to second ends of each of the resistors, respectively, and second ends of the switches are coupled to the first or second input ends of the operation amplifier 300. Second ends of the switches may be further coupled to a first end of a first input resistor or a first end of a second input resistor. The first and second input resistors may have resistance Rin. A second end of the first input resistor may not be coupled to the first supply voltage. A second end of the second input resistor may not be coupled to the second supply voltage. The resistors may be polysilicon resistors, transistors operated in the triode region, or a combination thereof, and the switches may be transistors.

Figure 5:
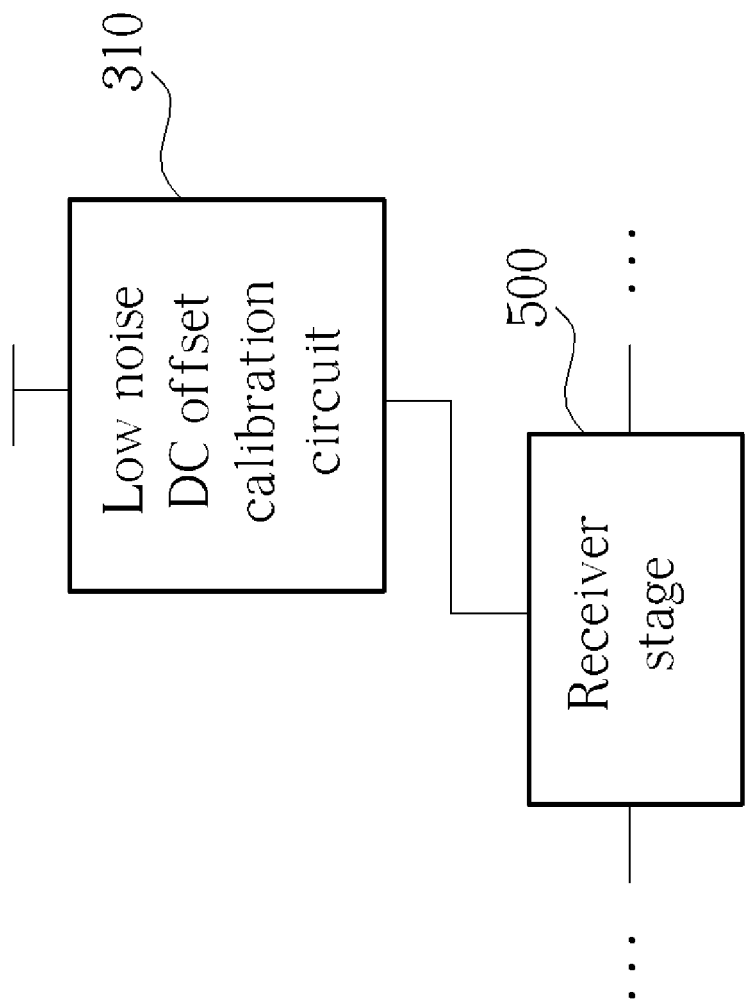
FIG. 5 is a diagram of a receiver stage calibrated by a low noise DC offset calibration circuit according to an embodiment of the present invention.

Due to the use of resistors instead of transistor current sources to provide the compensation current to the feedback resistors Rfb, the low noise DC offset calibration circuit 310 eliminates flicker noise and its effect on performance. The compensation current is decided then according to how the plurality of switched resistor units 311 are switched in. In one embodiment, the plurality of resistors of the switched resistor units 311 may be designed as having substantially equal resistance. In another embodiment, the plurality of resistors of the switched resistor units 311 may be designed with a binary proportion, e.g. 16:8:4:2:1, which may then be multiplied by a resistance coefficient, such as 1 kOhm, so as to form 16 k, 8 k, 4 k, 2 k and 1 kOhm resistors. In this way, a binary control signal may be applied to the plurality of switches to select a range of DC offset compensation currents to form a binary compensation current. For example, a signal of 1-0-1-0-0 may generate a resistance of 3.2 times the resistance constant, i.e. 3.2 kOhm, whereas a signal of 1-1-0-0-0 may generate a resistance of 5.333 times the resistance constant, i.e. 5.333 kOhm. A lower resistance results in a higher compensation current, and a higher resistance results in a lower compensation current. As a signal of 1-0-0-0-0 is input, the compensation current may then be $\frac{1}{16000}$ the supply voltage. Of course, to attain better resolution, greater numbers of switched resistor units 311 may be utilized, whereas fewer numbers may be utilized to reduce resolution. The low noise DC offset calibration circuit 310 may be applied to the programmable gain amplifier, or, as shown in FIG. 5, to another receiver stage 500, such as a low noise amplifier (LNA), mixer, or channel-select filter.

Figure 4:
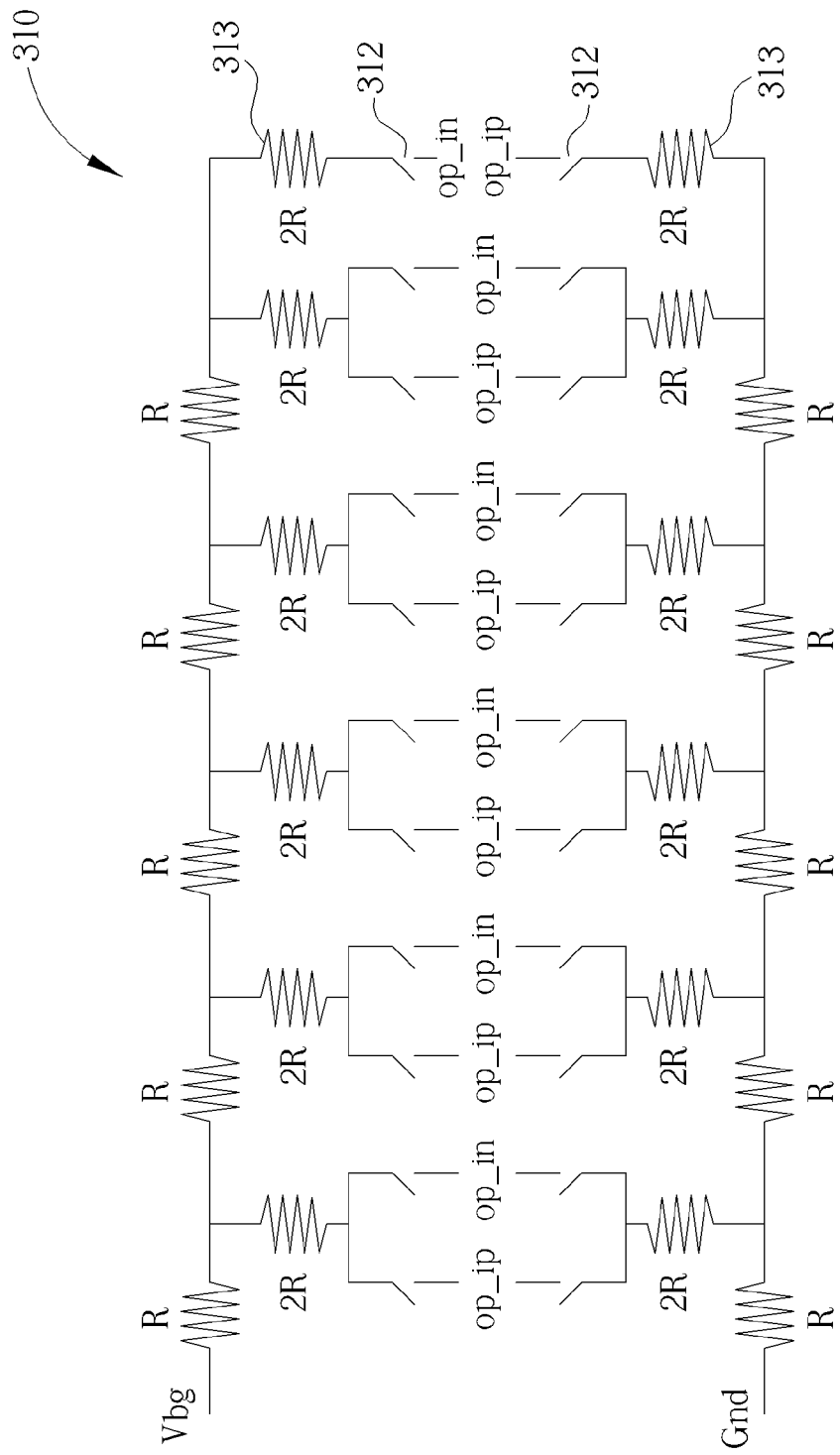
FIG. 4 is a diagram of a low noise DC offset calibration circuit according to a second embodiment of the present invention.

When taking into account power supply rejection ratio (PSRR) and size of resistor array utilized for the low noise DC offset calibration circuit 310, an architecture such as that shown in FIG. 4 becomes advantageous.

FIG. 4 is a diagram of the low noise DC offset calibration circuit 310 according to a second embodiment of the present invention. The low noise DC offset calibration circuit 310 shown in FIG. 4 comprises two R-2R resistor arrays that are coupled at respective first ends to a first supply voltage and a second supply voltage, respectively. In this embodiment, the first supply voltage may be a band-gap voltage, and the second supply voltage may be ground. The R-2R resistor arrays may be switched in to the first and second inputs op_ip, op_in of the operational amplifier 300 by a plurality of first switches and a plurality of second switches, respectively. As shown, each of the R-2R resistor arrays can be seen as a plurality of first resistors of first resistance R, a plurality of second resistors of second resistance 2R substantially twice the first resistance R, and a third resistor 313 of the second resistance 2R. The first resistors are in series, with a first end forming the first end of the R-2R resistor array, and a second end coupled to one of the second resistors. Consecutive first resistors form nodes, and the second resistors other than the one mentioned above are coupled to the nodes respectively. Each of the second resistors is coupled to one of the first switches and coupled to one of the second switches. The first and second switches may be turned on or off to couple or decouple the second resistors to or from the first input and the second input of the amplifier, respectively. The third resistor 313 of the one R-2R resistor array is coupled to the first input of the amplifier, and the third resistor 313 of the other R-2R resistor array is coupled to the second input of the amplifier. The third resistors 313 may be coupled to the respective first or second inputs of the amplifier through third switches 312. The third switches 312 may be nominally ON (closed). However, the third switches 312 may be replaced with short circuits.

In the example shown in FIG. 4, the resistor arrays are 5-bit controlled resistor arrays, whose current resolutions may be calculated as follows:

$$in_p = \frac{(v_{bg} - v_{cm})}{2R} * (b_4 * 2^{-1} + b_3 * 2^{-2} + b_2 * 2^{-3} + b_1 * 2^{-4} + b_0 * 2^{-5}) +$$
$$\frac{(0 - v_{cm})}{2R} * (\overline{b}_4 * 2^{-1} + \overline{b}_3 * 2^{-2} + \overline{b}_2 * 2^{-3} + \overline{b}_1 * 2^{-4} + \overline{b}_0 * 2^{-5}) +$$
$$\frac{(0 - v_{cm})}{2R} * 2^{-5}$$

$$in_n = \frac{(0 - v_{cm})}{2R} * (b_4 * 2^{-1} + b_3 * 2^{-2} + b_2 * 2^{-3} + b_1 * 2^{-4} + b_0 * 2^{-5}) +$$
$$\frac{(v_{bg} - v_{cm})}{2R} * (\overline{b}_4 * 2^{-1} + \overline{b}_3 * 2^{-2} + \overline{b}_2 * 2^{-3} + \overline{b}_1 * 2^{-4} + \overline{b}_0 * 2^{-5}) +$$
$$\frac{(v_{bg} - v_{cm})}{2R} * 2^{-5}$$

$$in_p - in_n = \frac{v_{bg}}{2R} * (b_4 * 2^{-1} + b_3 * 2^{-2} + b_2 * 2^{-3} + b_1 * 2^{-4} + b_0 * 2^{-5}) -$$
$$\frac{v_{bg}}{2R} * (\overline{b}_4 * 2^{-1} + \overline{b}_3 * 2^{-2} + \overline{b}_2 * 2^{-3} + \overline{b}_1 * 2^{-4} + \overline{b}_0 * 2^{-5}) - \frac{v_{bg}}{2R} * 2^{-5}$$

when $$vdac = 0 \Rightarrow in_p - in_n$$
$$= \frac{v_{bg}}{2R} * (2^{-1} + 2^{-2} + 2^{-3} + 2^{-4} + 2^{-5}) - \frac{v_{bg}}{2R} * 2^{-5}$$

-continued when $$vdac = 1 \Rightarrow in_p - in_n$$
$$= \frac{V_{bg}}{2R}*2^{-5} - \frac{V_{bg}}{2R}*(2^{-1}+2^{-2}+2^{-3}+2^{-4}) - \frac{V_{bg}}{2R}*2^{-5}$$

$$1LSB = \frac{V_{bg}}{2R}*2^{-4},$$

$$VLSB = \frac{V_{bg}}{2R}*2^{-4}*Rfb$$

where $in_p$ and $in_n$ are input currents provided by the low noise DC offset calibration circuit 310, $V_{bg}$ is a supply voltage, $V_{cm}$ is a common mode voltage, b0-b4 are control bits for the resistor array, $V_{dac}$ is a control signal applied to the switches, and ILSB is a least significant bit, or the current resolution. Of course, the least significant bit ILSB may be made even finer by adding more R-2R branches to the low noise DC offset calibration circuit 310. Or, the least significant bit ILSB may be made coarser by removing R-2R branches from the low noise DC offset calibration circuit 310.

Figure 6:
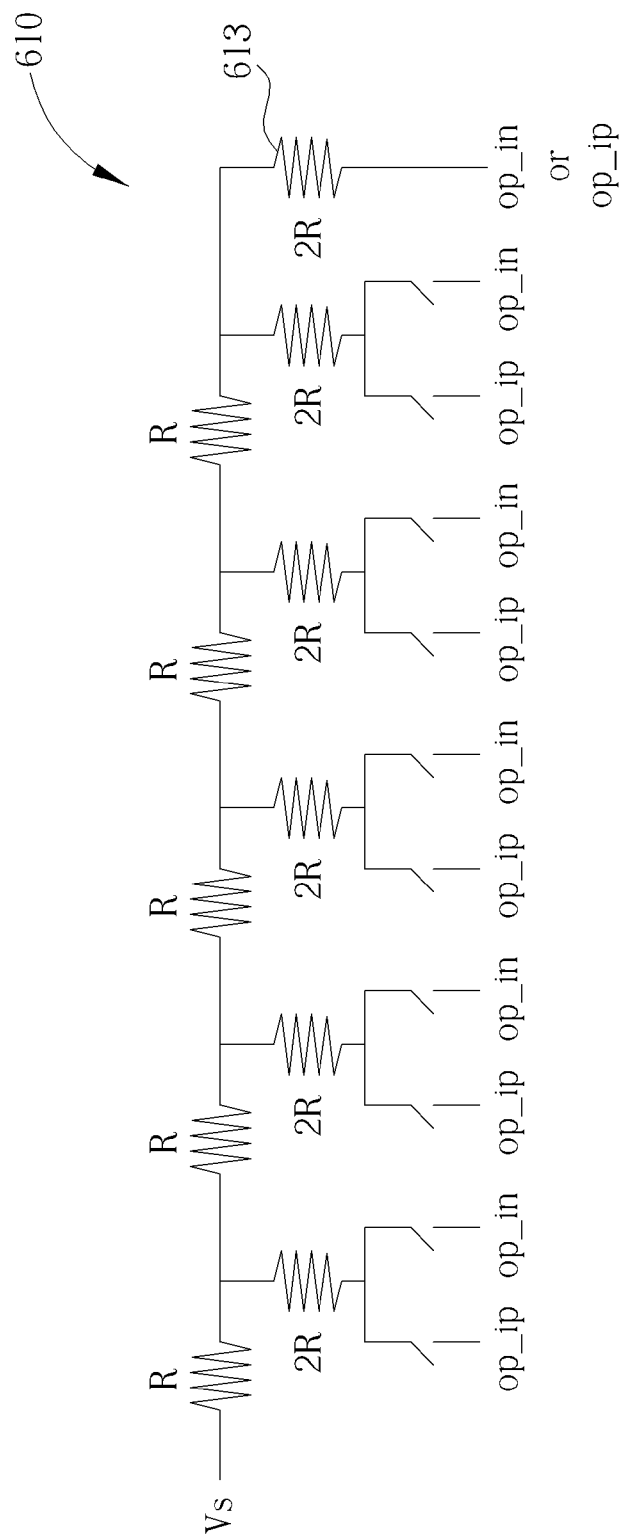
FIG. 6 is a diagram of a low noise DC offset calibration circuit according to a third embodiment of the present invention.

Please refer to FIG. 6, which is a diagram of a low noise DC offset calibration circuit 610, or "calibration circuit" 610, according to a third embodiment of the present invention. The low noise DC offset calibration circuit 610 shown in FIG. 6 comprises one R-2R resistor array that is coupled at a first end to a first supply voltage Vs. The first supply voltage Vs may be any supply voltages according to different design requirements. In one embodiment, the first supply voltage Vs may be a band-gap voltage. The R-2R resistor array may be switched in to the first and second inputs op_ip, op_in of the operational amplifier 300 by a plurality of first switches and a plurality of second switches, respectively. As shown, each of the R-2R resistor arrays can be seen as a plurality of first resistors of first resistance R, a plurality of second resistors of second resistance 2R substantially twice the first resistance R, and a third resistor 613 of the second resistance 2R. The first resistors are in series, with a first end forming the first end of the R-2R resistor array, and a second end coupled to one of the second resistors. Consecutive first resistors form nodes, and the second resistors other than the one mentioned above are coupled to the nodes respectively. Each of the second resistors is coupled to one of the first switches and one of the second switches. The first and second switches may be turned on or off to couple or decouple the second resistors to or from the first input and the second input of the amplifier, respectively. The third resistor 613 of the R-2R resistor array may be directly coupled to the first input or second input of the amplifier. In another embodiment, the third resistor 613 of the R-2R resistor array may be coupled to the first input or second input of the amplifier through a third switch (not shown in FIG. 6) similar to the third switch 312 shown in FIG. 4.

In the example shown in FIG. 6, when the third resistor 613 of the R-2R resistor array is coupled to the second input op_in, and the resistor array is a 5-bit controlled resistor array, whose current resolutions may be calculated as follows:

$$in_p = \frac{(v_s - v_{cm})}{2R}*(b_4*2^{-1}+b_3*2^{-2}+b_2*2^{-3}+b_1*2^{-4}+b_0*2^{-5})$$

$$in_n = \frac{(v_s - v_{cm})}{2R}*(\overline{b}_4*2^{-1}+\overline{b}_3*2^{-2}+\overline{b}_2*2^{-3}+\overline{b}_1*2^{-4}+\overline{b}_0*2^{-5}) +$$

$$\frac{(v_s - v_{cm})}{2R}*2^{-5}$$

$$in_p - in_n = \frac{(v_s - v_{cm})}{2R}*$$
$$(b_4*2^{-1}+b_3*2^{-2}+b_2*2^{-3}+b_1*2^{-4}+b_0*2^{-5}) -$$
$$\frac{(v_s - v_{cm})}{2R}*(\overline{b}_4*2^{-1}+\overline{b}_3*2^{-2}+\overline{b}_2*2^{-3}+\overline{b}_1*2^{-4}+\overline{b}_0*2^{-5}) -$$
$$\frac{(v_s - v_{cm})}{2R}*2^{-5}$$

when $$vdac = 0 \Rightarrow in_p - in_n$$
$$= -\frac{(v_s - v_{cm})}{2R}*(2^{-1}+2^{-2}+2^{-3}+2^{-4}+2^{-5}) - \frac{(v_s - v_{cm})}{2R}*2^{-5}$$

when $$vdac = 1 \Rightarrow in_p - in_n$$
$$= \frac{(v_s - v_{cm})}{2R}*2^{-5} - \frac{(v_s - v_{cm})}{2R}*(2^{-1}+2^{-2}+2^{-3}+2^{-4}) -$$
$$= \frac{(v_s - v_{cm})}{2R}*2^{-5}$$

$$I_{LSB} = \frac{(v_s - v_{cm})}{2R}*2^{-4},$$

$$V_{LSB} = \frac{(v_s - v_{cm})}{2R}*2^{-4}*Rfb$$

where $in_p$ and $in_n$ are input currents provided by the low noise DC offset calibration circuit 610, $V_s$ is a supply voltage, $V_{cm}$ is a common mode voltage, b0-b4 are control bits for the resistor array, $V_{dac}$ is a control signal applied to the switches, and $I_{LSB}$ is a least significant bit, or the current resolution. Of course, the least significant bit $I_{LSB}$ may be made even finer by adding more R-2R branches to the low noise DC offset calibration circuit 610. Or, the least significant bit $I_{LSB}$ may be made coarser by removing R-2R branches from the low noise DC offset calibration circuit 610.

Figure 7:
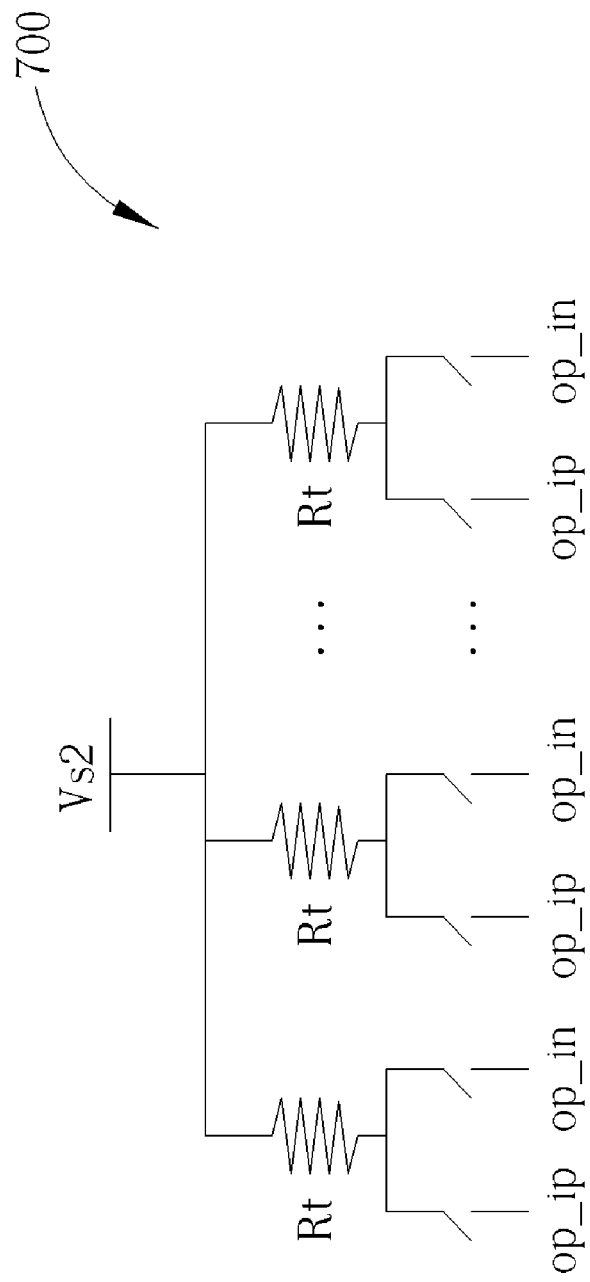
FIG. 7 is a diagram of a thermometer-type calibration circuit.

FIG. 7 is a diagram of a thermometer-type calibration circuit 700, or "calibration circuit" 700. When higher-resolution accuracy is required, a resistor array using thermometer code, such as the calibration circuit 700, may be used. The calibration circuit 700 comprises a plurality of thermometer resistors having resistance Rt. Each thermometer resistor of the plurality of thermometer resistors has a first end coupled to a second supply voltage Vs2, and a second end coupled to first ends of a first switch and a second switch. Each first switch has a second end coupled to a first input op_ip of an amplifier, such as an operational amplifier circuit 800 shown in FIG. 8. Each second switch has a second end coupled to a second input op_in of the amplifier. Current I flowing into each thermometer resistor of the calibration circuit 700 may be equal to (Vs2-Vcm)/Rt. The second source voltage Vs2 and the resistance Rt may be selected to generate current I equaling (Vs-Vcm)*$2^{-5}$/2R. Or, resistance of the plurality of resistors may have a binary pattern, such that the current I equals (Vs2-Vcm)/Rt, (Vs2-Vcm)/2Rt, (Vs2-Vcm)/4Rt, and so forth for each branch of the calibration circuit 700.

Figure 8:
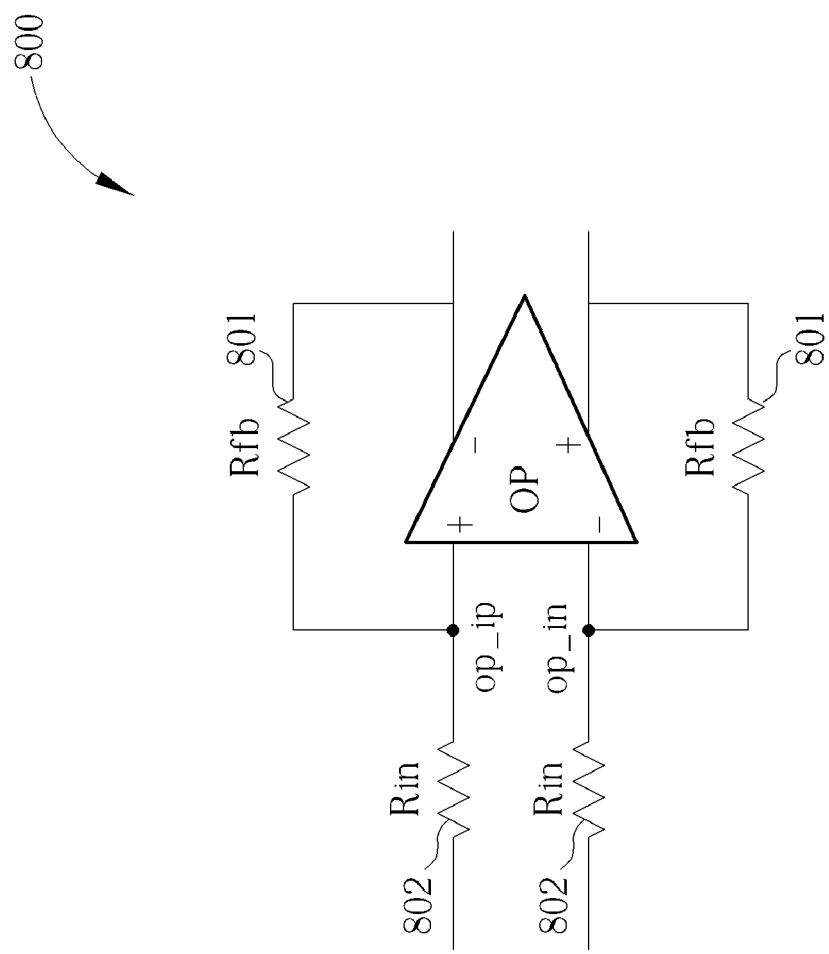
FIG. 8 is a diagram of an operational amplifier with feedback.

FIG. 8 is a diagram of an operational amplifier circuit 800 with feedback. The operational amplifier circuit 800 may comprise an operational amplifier OP, input resistors 802 having resistance Rin, and feedback resistors 801 having resistance Rfb. The first and second input terminals of the operational amplifier OP are coupled to the input resistors 802 and the feedback resistors 801 at the first and second input ends op_ip, op_in.

In one embodiment, the calibration circuit 700 may be used with the calibration circuit 610 for providing low-noise DC offset calibration of the operational amplifier 800 by coupling the first and second input ends op_ip, op_in of the operational amplifier circuit 800 to the op_ip, op_in of the calibration circuit 610 and the op_ip, op_in of the calibration circuit 700. The supply voltages Vs and Vs2 can be the same or not according to different design requirements.

Figure 9:
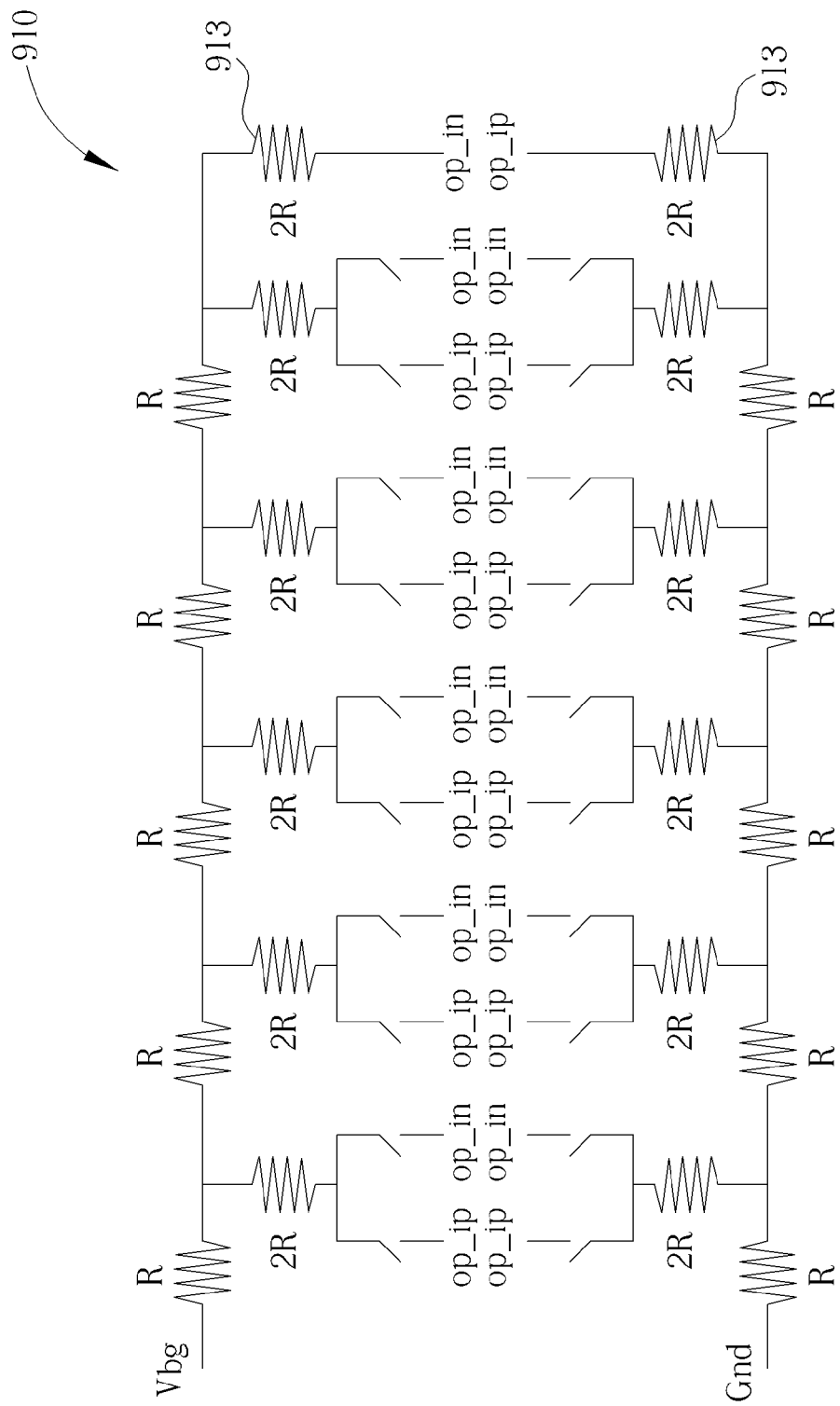
FIG. 9 is a diagram of a low noise DC offset calibration circuit according to a fourth embodiment of the present invention.

FIG. 9 is a diagram of a low noise DC offset calibration circuit 910, or "calibration circuit" 910, according to a fourth embodiment of the present invention. The low noise DC offset calibration circuit 910 shown in FIG. 9 comprises two R-2R resistor arrays that are coupled at respective first ends to a first supply voltage and a second supply voltage, respectively. In this embodiment, the first supply voltage may be a band-gap voltage, and the second supply voltage may be ground. The R-2R resistor arrays may be switched in to the first and second inputs op_ip, op_in of the operational amplifier circuit 800 by a plurality of first switches and a plurality of second switches, respectively. As shown, each of the R-2R resistor arrays can be seen as a plurality of first resistors of first resistance R, a plurality of second resistors of second resistance 2R substantially twice the first resistance R, and a third resistor 913 of the second resistance 2R. The first resistors are in series, with a first end forming the first end of the R-2R resistor array, and a second end coupled to one of the second resistors. Consecutive first resistors form nodes, and the second resistors other than the one mentioned above are coupled to the nodes respectively. Each of the second resistors is coupled to one of the first switches and one of the second switches. The first and second switches may be turned on or off to couple or decouple the second resistors to or from the first input and the second input of the amplifier, respectively. In this embodiment, the third resistor 913 of one R-2R resistor array is directly coupled to the first input op_ip of the amplifier, and the third resistor 913 of the other R-2R resistor array is directly coupled to the second input op_in of the amplifier. In another embodiment, the third resistor 913 may be coupled to the respective first or second inputs of the amplifier through a third switch (not shown in FIG. 9) similar to the third switch 312 shown in FIG. 4. The calibration circuit 910 may be used with the calibration circuit 700 for providing low-noise DC offset calibration of the operational amplifier 800 by coupling the first and second input ends op_ip, op_in of the operational amplifier circuit 800 to the op_ip, op_in of the calibration circuit 910, and coupling the first and second input ends op_ip, op_in of the operational amplifier circuit 800 to the op_ip, op_in of the calibration circuit 700.

The above low noise DC offset calibration circuits and related receiver stages, which may be fabricated by CMOS process or any other suitable processes, employ switched resistors or switched R-2R resistor arrays to provide DC offset compensation current, while maintaining improved noise performance due to reduction of flicker noise.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A DC offset calibration circuit comprising:
a first resistor, a first end of the first resistor coupled to a first supply voltage;
a second resistor, a first end of the second resistor coupled to a second end of the first resistor;
a third resistor, a first end of the third resistor coupled to the second end of the first resistor, and a second end of the third resistor coupled to a first input of an amplifier; and
a first switch, a first end of the first switch coupled to a second end of the second resistor, and a second end of the first switch coupled to the first input of the amplifier.

2. The DC offset calibration circuit of claim 1, further comprising:
a plurality of thermometer resistors, each thermometer resistor having a first end coupled to a second supply voltage; and
a plurality of thermometer switches, each thermometer switch having a first end coupled to a second end of a corresponding thermometer resistor of the plurality of thermometer resistors;
wherein a second end of each thermometer switch is coupled to the first input of the amplifier.

3. The DC offset calibration circuit of claim 2, wherein the first supply voltage is substantially equal to the second supply voltage.

4. The DC offset calibration circuit of claim 2, wherein each thermometer resistor of the plurality of thermometer resistors has substantially equal resistance.

5. The DC offset calibration circuit of claim 2, wherein resistances of the plurality of thermometer resistors have a binary proportion relationship.

6. The DC offset calibration circuit of claim 2, further comprising:
a fourth resistor, a first end of the fourth resistor coupled to a third supply voltage;
a fifth resistor, a first end of the fifth resistor coupled to a second end of the fourth resistor;
a sixth resistor, a first end of the sixth resistor coupled to the second end of the fourth resistor and a second end of the sixth resistor coupled to a second input of the amplifier; and
a second switch, a first end of the second switch coupled to a second end of the fifth resistor and a second end of the second switch coupled to the second input of the amplifier.

7. The DC offset calibration circuit of claim 1, wherein the second end of the first switch and a second end of the third resistor are further coupled to a first end of a first input resistor, and a second end of the first input resistor is not coupled to the first supply voltage.

8. The DC offset calibration circuit of claim 6, wherein the second end of the second switch and a second end of the sixth resistor are further coupled to a first end of a second input resistor, and a second end of the second input resistor is not coupled to the third supply voltage.

* * * * *